UNITED STATES PATENT OFFICE.

BRUNO REICHELT, OF NEWARK, NEW JERSEY, ASSIGNOR TO BETA FERTILIZER COMPANY, OF NEWARK, NEW JERSEY.

FERTILIZER.

943,460.  Specification of Letters Patent.  Patented Dec. 14, 1909.

No Drawing.  Application filed April 5, 1909.  Serial No. 488,006.

REISSUED

*To all whom it may concern:*

Be it known that I, BRUNO REICHELT, a citizen of the United States, residing at Newark, in the county of Essex and State of New Jersey, have invented certain new and useful Improvements in Fertilizers, of which the following is a specification.

This invention relates to fertilizers.

One object of the invention is to provide a fertilizer embodying properties capable of quickly enriching the roots of crops or vegetables to insure expeditious growth of the same.

Another object is to provide a fertilizer possessing such characteristics that it will not form into lumps, but will retain the condition requisite to preventing clogging of the fertilizing machinery and particularly provide for a "spray-like" or powdered feed thereof to the earth.

In compounding my fertilizer, I preferably employ talc rock containing potash and lime as a filler, the same being preferably deprived of all moisture and ground by suitable machinery into a dry finely powdered condition. Under certain conditions, I may employ 200 pounds of crushed or powdered talc containing approximately 6 per cent. of potash and approximately 4 per cent. of lime to which I may add 100 pounds of ground oyster shells containing approximately 4 per cent. of ammonia, and finally I add 40 pounds of ground phosphate rock containing approximately 68 per cent. of phosphorus, thoroughly mixing all of said ingredients in any suitable manner.

Talc is naturally slippery and will prevent the adherence of particles thereof or the formation of lumps in the mixture. Moreover, the talc will not only insure the maintenance of the required powdered condition of the mixture, but it will provide for a "spray-like" flow of the mixture when discharged from a fertilizer machine, thereby insuring an effectual impregnation of all parts of the earth over which the fertilizer is distributed.

My improved fertilizer has quick action upon the roots of crops incident to a high character of enriching properties, and the more it is used year after year, the richer becomes the ground.

What is claimed is:—

A fertilizer consisting of crushed talc containing potash and lime mixed with ground oyster shells containing ammonia and ground phosphate rock, substantially as described and for the purpose specified.

In testimony whereof I affix my signature, in presence of two witnesses.

BRUNO REICHELT.

Witnesses:
EDNA MACMAHON,
JULIUS SCHECK.